(12) United States Patent
Dillon et al.

(10) Patent No.: US 8,540,470 B2
(45) Date of Patent: Sep. 24, 2013

(54) LOCKING NUT

(75) Inventors: John W. Dillon, Franklin Grove, IL (US); Mark W. Hughes, Fulton, IL (US); Lee A. Hawkins, Fulton, IL (US); Stanley C. Nadig, Savanna, IL (US)

(73) Assignee: MacLean-Fogg Company, Mundelein, IL (US)

(*) Notice: Subject to any disclaimer, the term of this patent is extended or adjusted under 35 U.S.C. 154(b) by 233 days.

(21) Appl. No.: 13/013,227

(22) Filed: Jan. 25, 2011

(65) Prior Publication Data

US 2011/0188970 A1    Aug. 4, 2011

Related U.S. Application Data

(60) Provisional application No. 61/299,561, filed on Jan. 29, 2010.

(51) Int. Cl.
*F16B 39/10* (2006.01)
(52) U.S. Cl.
USPC .......................... 411/198; 411/221; 411/326
(58) Field of Classification Search
USPC .................. 411/197, 198, 326, 330–332, 121
See application file for complete search history.

(56) References Cited

U.S. PATENT DOCUMENTS

| | | | | |
|---|---|---|---|---|
| 292,513 A * | 1/1884 | Shailler | | 411/138 |
| 588,346 A * | 8/1897 | Mireault | | 411/330 |
| 1,212,033 A * | 1/1917 | Eneign et al. | | 411/198 |
| 1,287,270 A * | 12/1918 | Ensign | | 411/198 |
| 1,297,845 A * | 3/1919 | Hawrylasz | | 411/330 |
| 3,942,570 A * | 3/1976 | Bochman et al. | | 411/220 |
| 4,812,094 A | 3/1989 | Grube | | |
| 4,971,501 A * | 11/1990 | Chavez | | 411/221 |
| 5,180,265 A * | 1/1993 | Wiese | | 411/150 |
| 5,533,849 A | 7/1996 | Burdick | | |
| 5,597,278 A | 1/1997 | Peterkort | | |
| 8,011,866 B2 * | 9/2011 | Harris | | 411/150 |

* cited by examiner

*Primary Examiner* — Flemming Saether
(74) *Attorney, Agent, or Firm* — Brinks Hofer Gilson & Lione

(57) ABSTRACT

A nut fastener is provided for locking the nut to prevent inadvertent loosening of the nut. The nut fastener is particularly useful for tightening a wheel onto an axle. The nut fastener includes a nut, a collar and a retaining ring. The nut is unlocked by pushing on an engagement surface of the collar. When the collar is released, the collar locks against the nut.

32 Claims, 11 Drawing Sheets

FIG. 2
FIG. 3
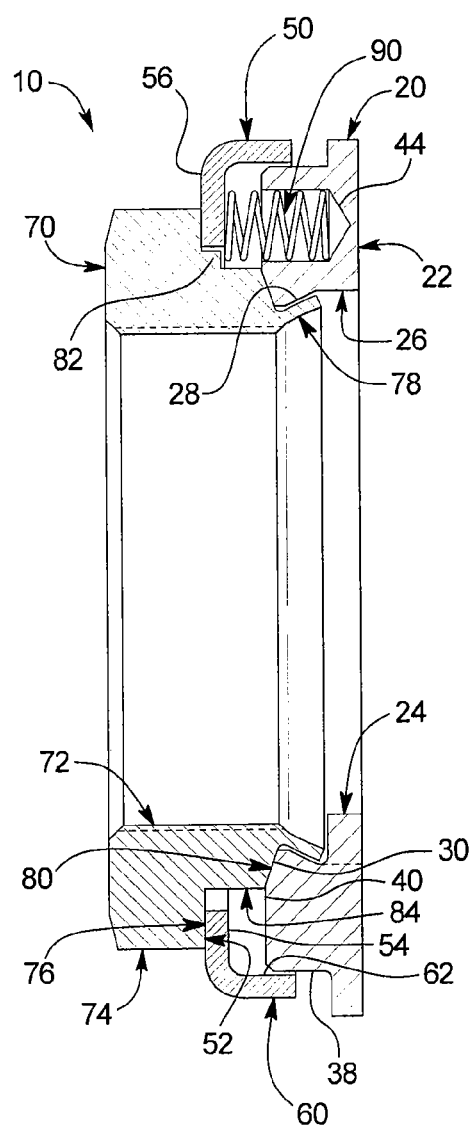
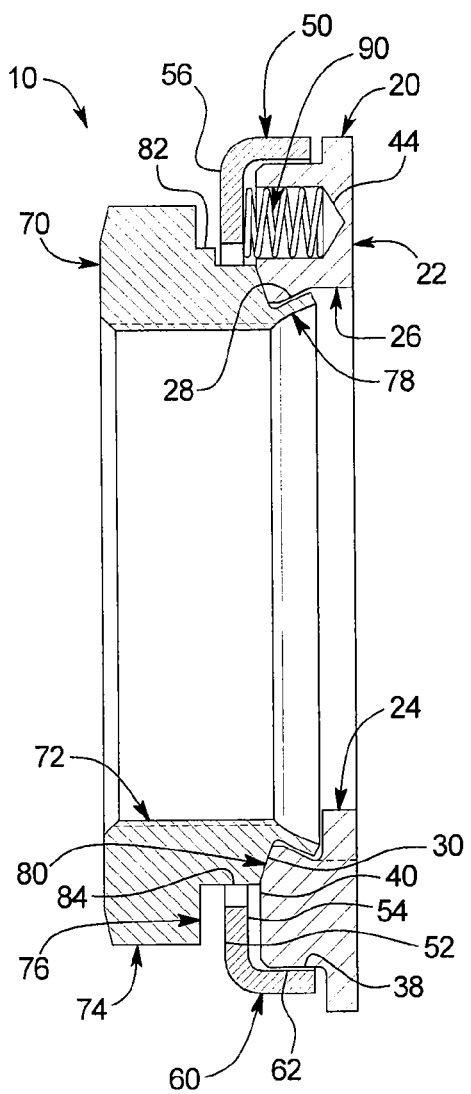

LOCKING NUT

This application claims priority to U.S. Provisional Application No. 61/299,561, filed Jan. 29, 2010, which is hereby incorporated by reference herein.

BACKGROUND

The present invention relates generally to internally threaded nuts and more particularly to a nut that can be locked to prevent the nut from loosening.

Nuts are known as a versatile component for fastening many different types of parts together. Fundamentally, a nut typically includes inner threads that are designed to engage corresponding external threads on a shaft. The nut further includes wrench bearing surfaces for rotating the nut with a tool. Accordingly, by rotating the nut, or by rotating the shaft and preventing the nut from rotating, the nut can be tightened or loosened on the shaft. Nuts are also typically provided with a pressure surface to apply longitudinal force to an apparatus.

One problem with conventional nuts is that they may inadvertently loosen during use. This commonly occurs when the apparatus that the nut is attached to experiences vibrations during use of the apparatus. Vibrations occur for numerous reasons and usually cannot be controlled by the designer, manufacturer or operator of an apparatus. For example, vibrations can be caused by internal forces necessary for the apparatus to function, such as an internal combustion engine or electric motor, or can be caused by external forces during use of the apparatus, such as a vehicle bouncing up and down as it travels over road. Vibrations can cause a nut to spontaneously loosen by causing fluctuations in the tension of the threaded engagement between the nut and the shaft. Because a nut requires more torque to tighten it than to loosen it, the nut seeks a lower tension state by spontaneously loosening when there is sufficient vibration to allow the nut to overcome whatever resistance there may be to loosening.

Various systems have been designed to prevent nuts from loosening after being initially tightened. A common way to address this problem is to increase the friction that the nut must overcome before loosening. One of the simplest approaches to increase friction is to provide the nut with a large pressure face that contacts the apparatus and applies longitudinal force to the apparatus. By increasing the size of the pressure face, the friction between the nut and the apparatus increases, and because the nut must overcome this friction to loosen, the nut is more resistant to loosening. Friction can be increased even further by providing protrusions on the pressure face that dig into the apparatus when the nut is tightened. Another way to reduce loosening of nuts is to add an expandable washer between the pressure face of the nut and the apparatus. Expandable washers absorb some of the fluctuations in tension of the fastener engagement so that the tension on the nut is more uniform. Thus, the nut is somewhat isolated from the vibrations and does not experience the full fluctuations in tension that it normally would experience. Another way to reduce loosening of nuts is to apply an adhesive or other material between the threads of a nut and the shaft. Depending on the type of material used, the result can be to essentially glue the nut and the shaft together to prevent relative movement or to increase the friction that the nut must overcome to loosen.

One problem with many solutions to nut loosening is that the nut can still loosen if enough vibrations occur to overcome the increased resistance to loosening. In other words, many approaches rely on increasing the resistance to loosening but do not provide a positive locking feature. Another problem with many solutions is that they also increase the amount of torque required to tighten the nut. This is a particular problem in applications where a precise amount of torque is required on the fastener to achieve a specified longitudinal force on the apparatus. Many solutions are not desirable in this type of application because the increased torque caused by a washer, adhesive or other friction enhancement feature is unpredictable and makes it difficult to achieve the precise longitudinal force that is required.

One particularly demanding application for nuts is axle nuts that attach the wheel hub of a vehicle to the axle. Foremost, axle nuts are a critical safety component in a vehicle because if an axle nut loosens, the wheel hub will first begin to wobble erratically and make it difficult to control the vehicle, and if the axle nut fully loosens, the wheel hub will fall off the vehicle, making control even more problematic. Another concern involving axle nuts is that the longitudinal force applied by the nut to the apparatus is typically used to preload the wheel bearings. The preload that is applied to the wheel bearings is required to be within a narrow tolerance to ensure that the bearings rotate properly and do not wear out prematurely. As a result, the torque that is applied to the axle nut must be reliably translated into longitudinal force without the unpredictability of other friction enhancement designs. Another concern is that extreme amounts of torque are applied to axle nuts since a single nut is usually used to fasten the wheel to a vehicle. Thus, the axle nut must be robust and any locking feature must also be sufficiently robust. In other wheel hub applications, the bearings may require a specified end play instead of preload. While this application does not require the higher torque settings that preloaded bearings typically require, precise setting and retention of the end play is still a critical function of the axle nut.

Accordingly, the inventor believes it would be desirable to provide an improved locking nut.

SUMMARY

A nut fastener is described for locking a nut. The nut fastener is provided with a retaining ring, a collar, a spring, and a nut. The retaining ring is rotationally fixed to a threaded shaft. The collar is rotationally fixed to the retaining ring. The nut is rotationally fixed to the collar when the spring biases the collar away from the retaining ring. When the collar is pushed toward the retaining ring to compress the spring, the nut becomes unlocked and can rotate relative to the collar, retaining ring and the threaded shaft. Additional details and advantages are described below in the detailed description.

The invention may include any of the following aspects in various combinations and may also include any other aspect described below in the written description or in the attached drawings.

A nut fastener, comprising:
a retaining ring comprising a first rotational retaining member engageable with a shaft thereby preventing relative rotation between the retaining ring and the shaft, a pressure surface adapted to apply longitudinal force to an apparatus, a first longitudinal retaining member, a first torque bearing surface, a first spring abutment surface, and a second rotational retaining member;
a collar comprising a third rotational retaining member engaged with the second rotational retaining member thereby preventing relative rotation between the collar and the retaining ring, a second spring abutment surface, a fourth rotational retaining member, a first stop surface, and an engagement surface;

a spring disposed between the first spring abutment surface and the second spring abutment surface, the spring thereby biasing the collar away from the retaining ring and the collar being longitudinally moveable toward the retaining ring by compressing the spring, and;

a nut comprising a second longitudinal retaining member engaged with the first longitudinal retaining member thereby preventing the nut and the retaining member from separating from each other, a second torque bearing surface engaged with the first torque bearing surface thereby translating torque from the nut to the retaining ring, a fifth rotational retaining member engageable with the fourth rotational retaining member thereby preventing relative rotation between the nut and the collar when the collar is biased away from the retaining ring by the spring, a second stop surface engageable with the first stop surface thereby restraining longitudinal movement of the collar by the spring when the fourth rotational retaining member and the fifth rotational retaining member are engaged, inner threads engageable with external threads on the shaft, and a plurality of wrench bearing surfaces engageable with a tool to rotate the nut;

wherein a force applied to the engagement surface compresses the spring and moves the collar toward the retaining ring, the fourth rotational retaining member and the fifth rotational retaining member thereby disengaging from each other to allow relative rotation between the nut and the collar.

The nut fastener wherein the second rotational retaining member is a tab extending away from an axis of the fastener and the third rotational retaining member is a recess receiving the tab.

The nut fastener further comprising at least three of the second rotational retaining member and at least three of the third rotational retaining member equally spaced around a circumference of the retaining ring.

The nut fastener wherein the fifth rotational retaining member is a tab extending away from an axis of the fastener and the fourth rotational retaining member is a recess receiving the tab, the collar comprising a plurality of the recesses disposed around an inner circumference of the collar.

The nut fastener further comprising at least three of the fifth rotational retaining member and at least three of the fourth rotational retaining member equally spaced around a circumference of the nut.

The nut fastener wherein the first rotational retaining member is a tab engageable with a slot in the shaft.

The nut fastener wherein the spring is a circular spring disposed around an axis of the fastener, the first spring abutment surface being a ring extending around the axis.

The nut fastener wherein the spring is a coil spring and the first spring abutment surface is a bottom of a spring pocket.

The nut fastener wherein the first torque bearing surface and the second torque bearing surface are angled surfaces with the first torque bearing surface facing away from the pressure surface.

The nut fastener wherein the second retaining member is a flared portion of the nut and the first retaining member is an angled surface corresponding to the flared portion.

The nut fastener wherein the collar is a stamping from a plate, the collar thereby having a generally uniform thickness.

The nut fastener wherein the engagement surface is generally flush with the first stop surface, the engagement surface being disposed adjacent a bottom end of the wrench bearing surfaces when the first stop surface is biased against the second stop surface by the spring, the engagement surface thereby being engageable by an end of the tool when the tool engages the wrench bearing surfaces to apply the force to disengage the fourth rotational retaining member and the fifth rotational retaining member.

The nut fastener wherein the nut further comprises a recess along at least one of the wrench bearing surfaces, wherein an end of the fifth rotational retaining member is visible through the recess.

The nut fastener wherein the end of the fifth rotational retaining member extends past the second stop surface toward the wrench bearing surfaces.

The nut fastener further comprising three of the wrench bearing surfaces with the recess, each of the three wrench bearing surfaces disposed between two of the wrench bearing surfaces without the recess.

The nut fastener wherein the collar is a stamping from a plate, the collar thereby having a generally uniform thickness, the collar comprising a bent portion extending longitudinally toward the retaining ring, an inner surface of the bent portion encompassing an entire outer circumference of the retaining ring, wherein no portion of the retaining ring extends out from the inner surface of the bent portion.

The nut fastener wherein the second rotational retaining member is a retaining ring tab extending away from an axis of the fastener, the third rotational retaining member is a first collar recess receiving the retaining ring tab, the fifth rotational retaining member is a nut tab extending away from an axis of the fastener, and the fourth rotational retaining member is a second collar recess receiving the nut tab, the collar comprising a plurality of the second collar recesses disposed around an inner circumference of the collar.

The nut fastener wherein the first torque bearing surface and the second torque bearing surface are angled surfaces with the first torque bearing surface facing from the pressure surface and the second retaining member is a flared portion of the nut and the first retaining member is an angled surface corresponding to the flared portion.

The nut fastener further comprising at least three of the second rotational retaining member and at least three of the third rotational retaining member equally spaced around a circumference of the retaining ring, and at least three of the fifth rotational retaining member and at least three of the fourth rotational retaining member equally spaced around a circumference of the nut.

The nut fastener wherein the first rotational retaining member is an inner tab engageable with a slot in the shaft, the spring being a circular spring disposed around an axis of the fastener, the first spring abutment surface being a ring extending around the axis, the collar being a stamping from a plate, the collar thereby having a generally uniform thickness, and the engagement surface is generally flush with the first stop surface, the engagement surface being disposed adjacent a bottom end of the wrench bearing surfaces when the first stop surface is biased against the second stop surface by the spring, the engagement surface thereby being engageable by an end of the tool when the tool engages the wrench bearing surfaces to apply the force to disengage the fourth rotational retaining member and the fifth rotational retaining member.

The nut fastener wherein the collar is a stamping from a plate, the collar thereby having a generally uniform thickness, the engagement surface being generally flush with the first stop surface, the engagement surface being disposed adjacent a bottom end of the wrench bearing surfaces when the first stop surface is biased against the second stop surface by the spring, the engagement surface thereby being engageable by an end of the tool when the tool engages the wrench bearing surfaces to apply the force to disengage the fourth rotational retaining member and the fifth rotational retaining member, and the fifth rotational retaining member is a nut tab extending away from an axis of the fastener and the fourth rotational retaining member is a second collar recess receiving the nut tab, the collar comprising a plurality of the second collar recesses disposed around an inner circumference of the collar.

The nut fastener wherein the second rotational retaining member is a retaining ring tab extending away from an axis of the fastener and the third rotational retaining member is a first collar recess receiving the retaining ring tab, further comprising at least three of the second rotational retaining member and at least three of the third rotational retaining member equally spaced around a circumference of the retaining ring, and at least three of the fifth rotational retaining member and at least three of the fourth rotational retaining member equally spaced around a circumference of the nut.

The nut fastener wherein the second rotational retaining member is a retaining ring tab extending away from an axis of the fastener and the third rotational retaining member is a first collar recess receiving the retaining ring tab, the fifth rotational retaining member is a nut tab extending away from an axis of the fastener and the fourth rotational retaining member is a second collar recess receiving the tab, the collar comprising a plurality of the second collar recesses disposed around an inner circumference of the collar, further comprising at least three of the second rotational retaining member and at least three of the third rotational retaining member equally spaced around a circumference of the retaining ring, and at least three of the fifth rotational retaining member and at least three of the fourth rotational retaining member equally spaced around a circumference of the nut, the first rotational retaining member being an inner tab engageable with a slot in the shaft, the first torque bearing surface and the second torque bearing surface being angled surfaces with the first torque bearing surface facing from the pressure surface, the second retaining member being a flared portion of the nut and the first retaining member being an angled surface corresponding to the flared portion, the collar being a stamping from a plate, the collar thereby having a generally uniform thickness, and the engagement surface is generally flush with the first stop surface, the engagement surface being disposed adjacent a bottom end of the wrench bearing surfaces when the first stop surface is biased against the second stop surface by the spring, the engagement surface thereby being engageable by an end of the tool when the tool engages the wrench bearing surfaces to apply the force to disengage the fourth rotational retaining member and the fifth rotational retaining member.

The nut fastener wherein the spring is a circular spring disposed around an axis of the fastener, the first spring abutment surface being a ring extending around the axis.

The nut fastener wherein the fourth rotational retaining member is a ratchet tooth with an inclined surface and a locking surface and the fifth rotational retaining member is a corresponding ratchet tooth with a corresponding inclined surface and a corresponding locking surface, the inclined surfaces biasing the collar toward the retaining ring to allow relative rotation between the nut and the collar in a tightening direction, and when the force is not applied the locking surfaces prevent relative rotation between the nut and the collar in a loosening direction.

The nut fastener wherein the collar comprises a bent portion extending longitudinally toward the retaining ring, an inner surface of the bent portion encompassing an entire outer circumference of the retaining ring, wherein no portion of the retaining ring extends out from the inner surface of the bent portion.

The nut fastener wherein the second rotational retaining member is a retaining ring tab extending away from an axis of the fastener, the third rotational retaining member is a first collar recess receiving the retaining ring tab, further comprising at least three of the second rotational retaining member and at least three of the third rotational retaining member equally spaced around a circumference of the retaining ring, the collar comprises a bent portion extending longitudinally toward the retaining ring, an inner surface of the bent portion encompassing an entire outer circumference of the retaining ring, wherein no portion of the retaining ring extends out from the inner surface of the bent portion, the fourth rotational retaining member is a ratchet tooth with an inclined surface and a locking surface and the fifth rotational retaining member is a corresponding ratchet tooth with a corresponding inclined surface and a corresponding locking surface, the inclined surfaces biasing the collar toward the retaining ring to allow relative rotation between the nut and the collar in a tightening direction, and when the force is not applied the locking surfaces prevent relative rotation between the nut and the collar in a loosening direction, further comprising more than three of the fifth rotational retaining member and more of the fourth rotational retaining member than the fifth rotational retaining member equally spaced around a circumference of the nut and the collar, the first rotational retaining member is an inner tab engageable with a slot in the shaft, the spring being a circular spring disposed around an axis of the fastener, the spring being disposed within a groove in the retaining ring, the engagement surface is generally flush with the first stop surface, the engagement surface being disposed adjacent a bottom end of the wrench bearing surfaces when the first stop surface is biased against the second stop surface by the spring, the engagement surface thereby being engageable by an end of the tool when the tool engages the wrench bearing surfaces to apply the force to disengage the fourth rotational retaining member and the fifth rotational retaining member.

BRIEF DESCRIPTION OF SEVERAL VIEWS OF THE DRAWINGS

The invention may be more fully understood by reading the following description in conjunction with the drawings, in which:

FIG. 2 is a side cross-sectional view of the nut fastener in a locked position;

FIG. 3 is a side cross-sectional view of the nut fastener in an unlocked position;

DETAILED DESCRIPTION

Figure 6:
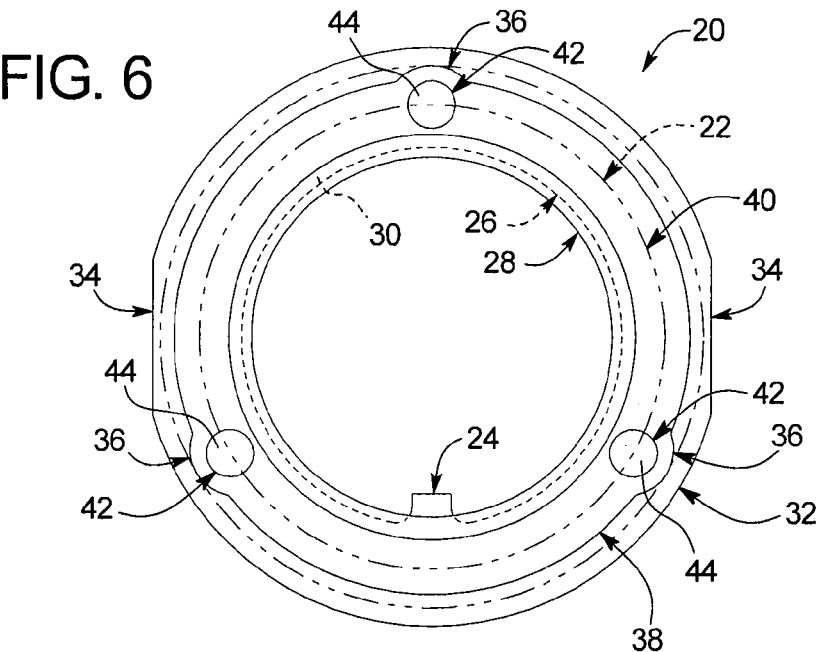
FIG. 6 is a top plan view of a retaining ring.
Figure 8:
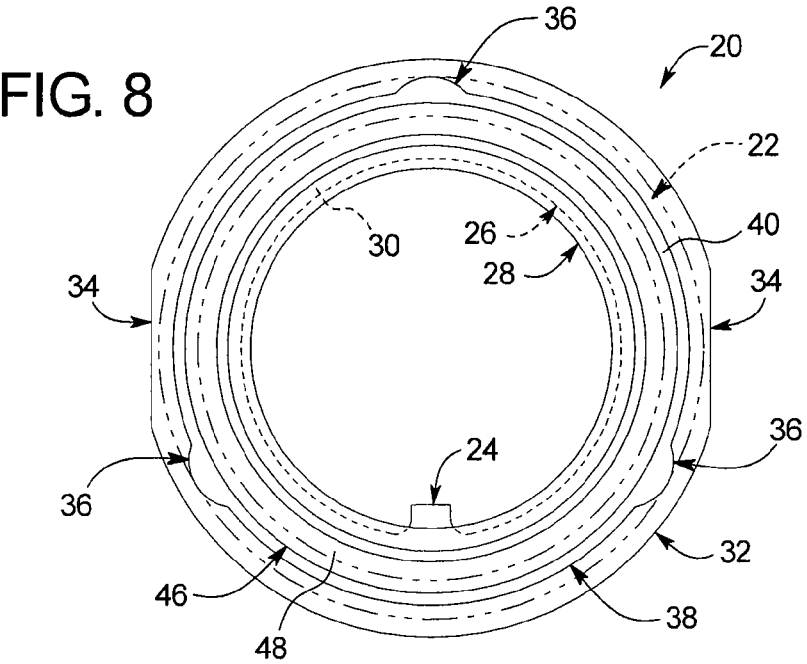
FIG. 8 is a top plan view of another embodiment of a retaining ring.

Referring now to the figures, a nut fastener 10 is shown. The nut fastener 10 may include a retaining ring 20, a collar 50, a nut 70, and a spring 90, 92. The retaining ring 20 is shown by itself in FIGS. 6 and 8 and in cross-section in FIGS. 2-3. The retaining ring 20 includes a pressure surface 22 that is designed to contact an apparatus that the nut fastener 10 is attached to and apply longitudinal force from the nut fastener 10 to the apparatus. The retaining ring 20 also includes an inner tab 24, or first rotational retaining member 24, that is designed to engage with a slot in a threaded shaft to prevent rotation between the retaining ring 20 and the shaft. The inner diameter 26 of the retaining ring 20 adjacent the pressure surface 22 provides clearance for the threaded shaft and for the retaining member 78 of the nut 70. A first longitudinal retaining surface 28, or member 28, may be provided adjacent the inner diameter 26. The first longitudinal retaining surface 28 may be angled so that it is facing the pressure surface 22. A first torque bearing surface 30 may be provided adjacent the first longitudinal retaining surface 28. The first torque bearing surface 30 may be angled so that it is facing away from the pressure surface 22. The outer diameter 32 of the retaining ring 20 may be slightly larger than the outer diameter of the collar 50 so that the outer diameter 32 of the retaining ring 20 is the largest diameter of the nut fastener 10. The outer diameter 32 may also be provided with opposing flat sides 34 that are spaced apart approximately the same width as the outer diameter of the collar 50. The opposing flat sides 34 may be useful for retaining the retaining ring 20 with a tool to prevent rotation of the retaining ring 20. The retaining ring 20 is also provided with three tabs 36, or second rotational retaining members 36, that extend away from the axis of the fastener 10 and are equally spaced around the outer circumference of the retaining ring 20. As shown in FIGS. 6 and 8, the flat sides 34 may be oriented away from the outer tabs 36 in order to reduce the profile of the nut fastener 10. The retaining ring 20 may also be provided with a first slide surface 38 around the outer circumference of the retaining ring 20 inward from the outer diameter 32 of the retaining ring 20. A fourth stop surface 40 may be provided on an opposite side of the retaining ring 20 from the pressure surface 22. As shown, in FIG. 6, the retaining ring 20 may be provided with three spring pockets 42 equally spaced around the retaining ring 20. The bottom surface 44 of each of the spring pockets 42 may be a first spring abutment surface 44. Preferably, each of the spring pockets 42 is located at one of the outer tabs 36 so that the outer surfaces of the tabs 36 wrap around the spring pockets 42. As shown in FIG. 8, the retaining ring 20 may alternatively be provided with a groove 46 in the fourth stop surface 40 so that the bottom 48 of the groove 46 may be a first spring abutment surface 48 in the form of a ring around the axis of the fastener 10.

Figure 5:
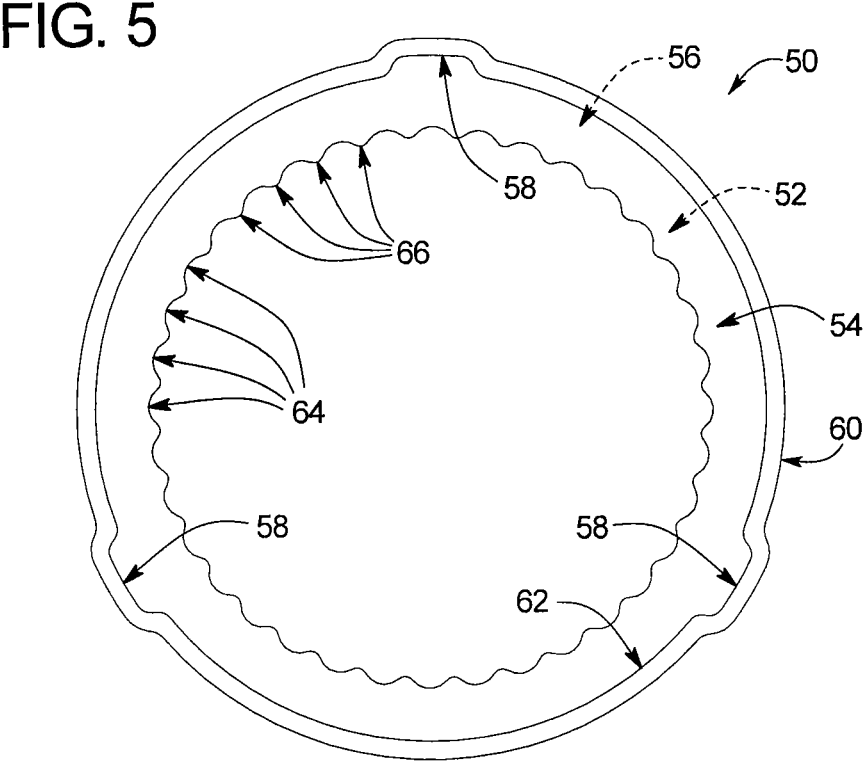
FIG. 5 is a bottom plan view of a collar.

The collar 50 is shown by itself in FIG. 5 and in cross-section in FIGS. 2-3. The collar 50 is preferably formed as a stamping from a plate so that the thickness of the collar 50 is generally uniform throughout. The collar 50 is provided with a first stop surface 52 and a third stop surface 54 that are disposed on opposite sides of the collar 50. The collar 50 may also be provided with an engagement surface 56 that extends outward from the wrench bearing surfaces 74 when the nut fastener 10 is assembled. Preferably, the engagement surface 56 and the first stop surface 52 are flush with each other. The collar 50 may also be provided with a second spring abutment surface 54, which may be the same surface 54 as the third stop surface 54. The outer circumference of the collar 50 may be provided with three first recesses 58, or third rotational retaining members 58, that receive the retaining ring tabs 36. The first recesses 58 may be formed by bending a portion 60 of the collar 50 so that the outer diameter of the bent portion 60 extends longitudinally along the nut fastener 10. The inner surface 62 of the bent portion 60 may provide a second slide surface 62 that guides the collar 50 along the retaining ring 20. The inner circumference of the collar 50 may be provided with a plurality of second recesses 64, or fourth rotational retaining members 64. The inner circumference 66 of the collar 50 may form a third slide surface 66 that slides along the fourth slide surface 84 of the nut 70.

Figure 1:
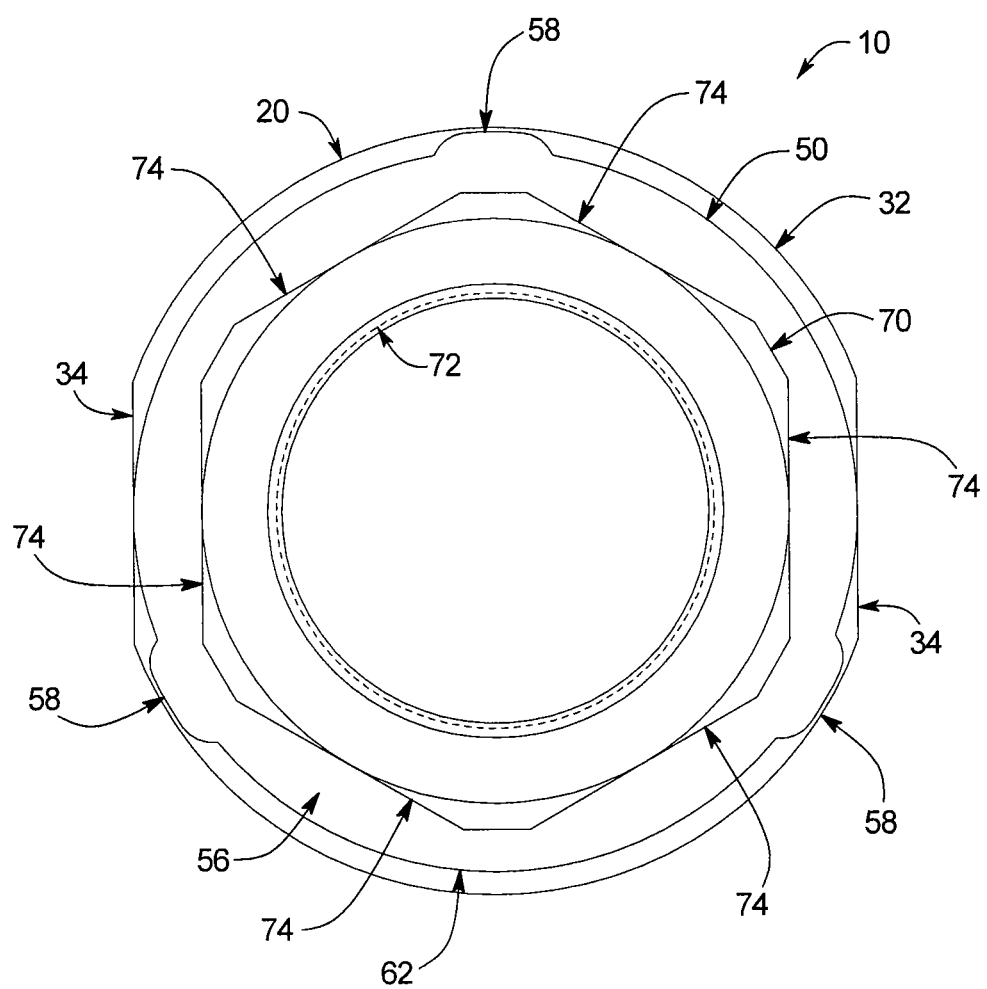
FIG. 1 is a top plan view of a nut fastener.
Figure 4:
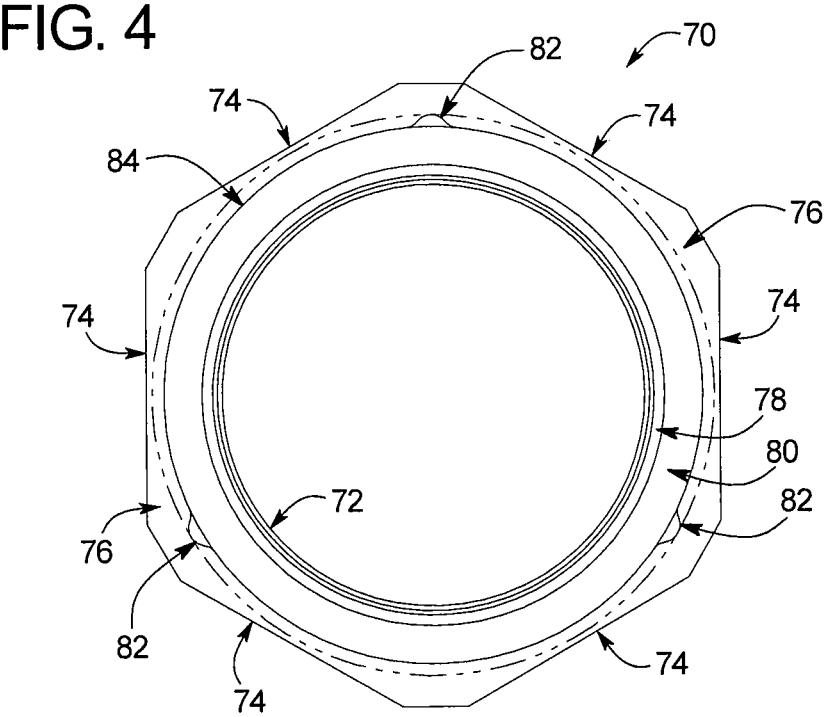
FIG. 4 is a bottom plan view of a nut.

The nut 70 is shown by itself in FIG. 4 and in cross-section in FIGS. 2-3. The nut 70 includes inner threads 72 that are designed to engage with external threads of a shaft. The nut 70 also includes wrench bearing surfaces 74 that are designed to be engaged by a tool to rotate the nut 70. A second stop surface 76 may be provided at the bottom of the wrench bearing surfaces 74. The nut 70 may be provided with a flared portion 78, or second longitudinal retaining member 78. Although the flared portion 78 may be formed and shaped in various ways, one desirable way to make the flared portion 78 is to initially form the flared portion 78 as a straight extension of the nut 70. During assembly, the straight extension may be inserted through the retaining ring 20 and the straight extension can be swaged to form the flared portion 78. The nut 70 may also be provided with a second torque bearing surface 80 that corresponds to the first torque bearing surface 30 of the retaining ring 20. Around the outer circumference, the nut 70 may be provided with three tabs 82, or fifth rotational retaining members 82, that extend outward from the axis of the fastener 10. The tabs 82 may extend outward from a fourth slide surface 84 and away from the second stop surface 76 toward the pressure surface 22 of the retaining ring 20. The tabs 80 extend only along a portion of the fourth slide surface 84 so that the collar 50 can disengage from the tabs 82 as described further below.

Figure 7:
FIG. 7 is a side perspective view of a wave spring.

The springs 90, 92 may be either coil springs 90 as shown in FIGS. 2-3 or may be a circular or wave spring 92 as shown in FIG. 7. If coil springs 90 are used, it is preferable to provide spring pockets 42 in the retaining ring 20 as shown in FIGS. 2-3 and 6. On the other hand, if a circular spring 92 is used, a groove 46 in the retaining ring 20 as shown in FIG. 8 is preferred.

Figure 9:
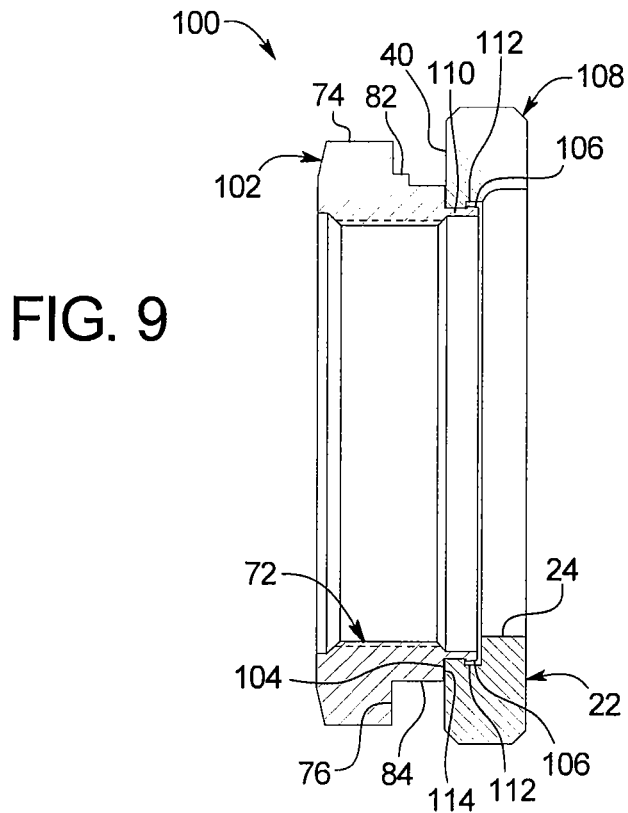
FIG. 9 is a side cross-sectional view of another embodiment of a nut fastener.

In another embodiment of the nut fastener 100, as shown in FIG. 9, the second longitudinal retaining member 106 may be a bead 106 that is machined onto the nut 102. The retaining ring 108 may be provided with an inner diameter 110 that is smaller than the diameter of the nut bead 106. In order to assemble this arrangement of the nut fastener 100, the nut bead 106 may be pressed through the inner diameter 110 of the retaining ring 108 until the nut bead 106 passes through the inner diameter 110 and is received by an undercut groove 112 that is larger in diameter than the nut bead 106. To aid assembly, the inner diameter 110 of the retaining ring 108 and the nut bead 106 may be provided with chamfers. As also shown, the first and second torque bearing surfaces 116, 104 may be flat and orthogonal to the axis instead of being angled. Although not shown in FIG. 9, a collar 50 and wave spring 92 as described above may be adapted to this particular arrangement of the nut fastener 100.

Figure 10:
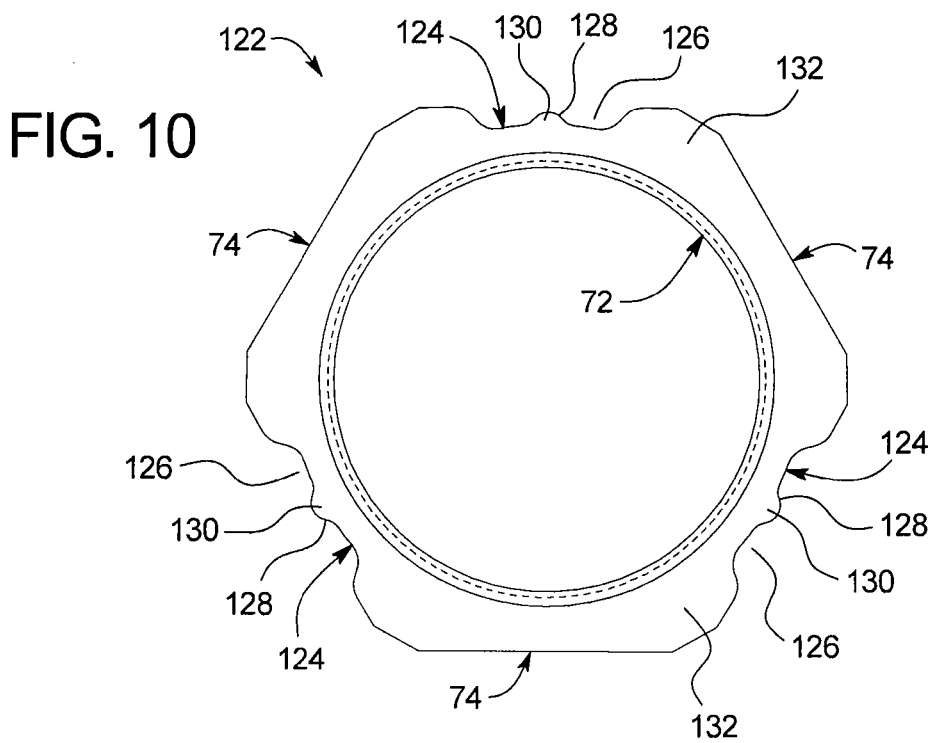
FIG. 10 is a top plan view of another embodiment of a nut.
Figure 11:
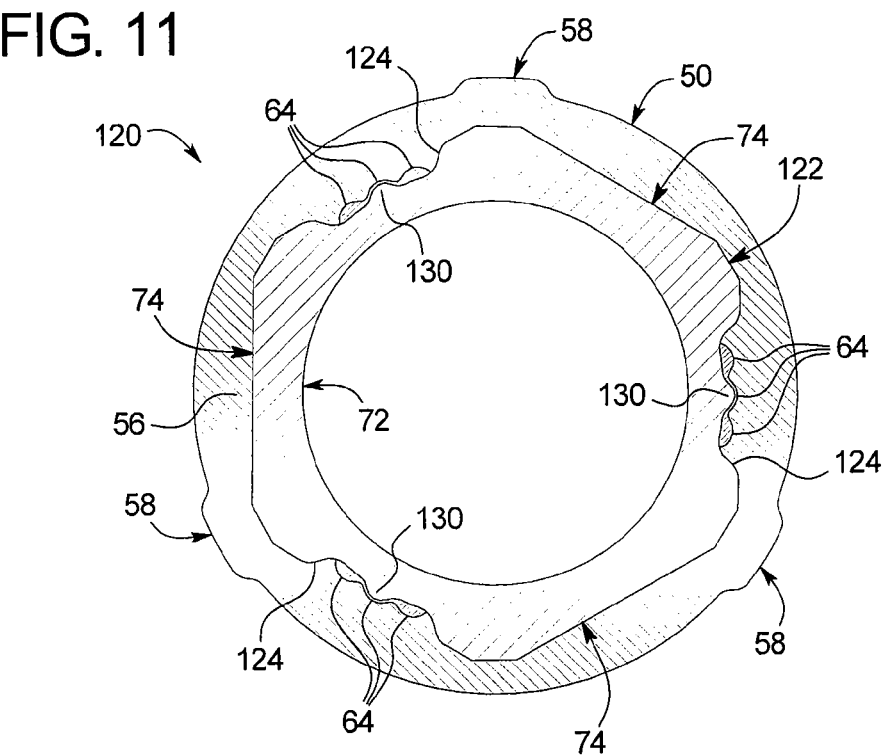
FIG. 11 is a top plan view of another embodiment of a nut fastener.
Figure 12:
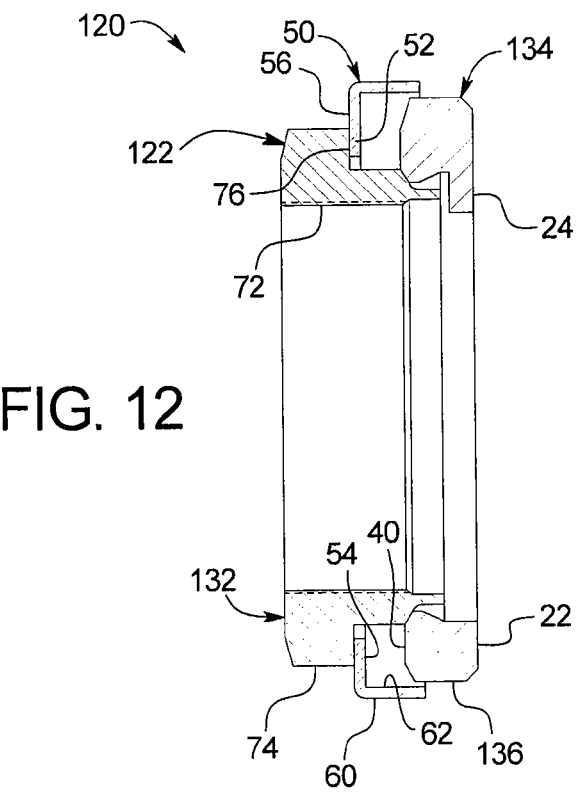
FIG. 12 is a side cross-sectional view of the nut fastener of FIG. 11.

Turning the FIGS. 10-12, another embodiment of the nut fastener 120 is shown. The nut 122 is shown by itself in FIG.

10 and assembled in the nut fastener 120 in FIGS. 11-12. As shown, one or more of the wrench bearing surfaces 124 may include a recessed area 126 that exposes the end 130 of the nut tab 128 that faces toward the wrench bearing surfaces 74, 126. If desired, the tabs 128 may extend through the recessed areas 126 and past the second stop surface 76. The ends 130 of the tabs 128 may also be flush with the top surface 132 of the nut 122 and the wrench bearing surfaces 74, 126. As shown in FIG. 11, one advantage of this arrangement of the nut fastener 120 is that the nut tabs 128 are visible from the top of the nut fastener 120. The second collar recesses 64 that are positioned within the recessed area 126 are also visible from the top of the nut fastener 120. As a result, the operator can visually verify that the nut tabs 128 are solidly locked in the second collar recesses 64 when tightening the nut fastener 120.

As shown in FIG. 12, the collar 50 may have a uniform thickness throughout and may be formed by stamping a plate. The collar 50 may have a bent portion 60 that extends longitudinally away from the first stop surface 52 and toward the retaining ring 134. As shown, the inner surface 62 of the bent portion 60 may fully encompass the entire outer circumference 136 of the retaining ring 134. The retaining ring 134 may also be formed without any portion extending out from the inner surface 62 of the bent portion 60 of the collar 50. As a result, this arrangement of the nut fastener 120 provides a compact profile with a small circumferential shape. The thickness of the retaining ring 134 may also be minimized since the longitudinal travel of the collar 50 is not inhibited by any portion of the retaining ring 134.

Accordingly, it is now apparent how the nut fastener 10, 100, 120 functions. The nut fastener 10, 100, 120 is initially placed over the end of a threaded shaft so that the inner tab 24 of the retaining ring 20, 108, 134 is engaged within a slot in the shaft. This prevents the retaining ring 20, 108, 134 from rotating relative to the shaft. The nut 70, 102, 122 is permanently secured to the retaining ring 20, 108, 134 by the flared portion 78 or the machined bead 106 of the nut 70, 102, 122 which engages the first longitudinal retaining surface 28, 112 of the retaining ring 20, 108, 134 and prevents the nut 70, 102, 122 from being separated from the retaining ring 20, 108, 134. Likewise, the collar 50 and the springs 90, 92 are trapped between the nut 70, 102, 122 and the retaining ring 20, 108, 134 so that the entire nut assembly 10, 100, 120 is permanently attached together in an integrated nut assembly 10, 100, 120. In order to unlock the nut 70, 102, 122, the engagement surface 56 of the collar 50 must be pushed toward the pressure surface 22. When the engagement surface 56 is pushed, the second spring abutment surface 54 of the collar 50 compresses the spring 90, 92 against the first spring abutment surface 44, 48 of the retaining ring 20, 108, 134. This allows the collar 50 to slide toward the retaining ring 20, 108, 134 along the first slide surface 38 of the retaining ring 20, 108, 134 and the second slide surface 62 of the collar 50 and/or the third slide surface 66 of the collar 50 and the fourth slide surface 84 of the nut 70, 102, 122. Once the collar 50 slides far enough for the second recesses 64 of the collar 50 to disengage from the tabs 82, 128 of the nut 70, 102, 122, the nut 70, 102, 122 becomes unlocked and can rotate relative to the threaded shaft, the retaining ring 20, 108, 134 and the collar 50. The longitudinal travel of the collar 50 is limited in the disengagement direction by the third stop surface 54 of the collar 50 and the fourth stop surface 40 of the retaining ring 20, 108, 134. However, the nut tabs 82, 128 and the second collar recesses 64 may disengage before the third and fourth stop surfaces 54, 40 contact. In the engagement direction, the longitudinal travel of the collar 50 is limited by the first stop surface 52 of the collar 50 and the second stop surface 76 of the nut 70, 102, 122.

When the engagement surface 56 is flush with the first stop surface 52 of the collar 50, the engagement surface 56 may be easily pushed by the end of the tool that is used to engage the wrench bearing surfaces 74, 124. Thus, for example, when a torque socket is used, the nut assembly 10, 100, 120 can be unlocked by simply sliding the torque socket onto the wrench bearing surfaces 74, 124 and pushing the torque socket against the engagement surface 56. The torque tool can then be turned to rotate the nut 70, 102, 122. Torque from rotating the nut 70, 102, 122 is translated from the second torque bearing surface 80, 104 of the nut 70, 102, 122 to the first torque bearing surface 30, 114 of the retaining ring 20, 108, 134. Since the retaining ring 20, 108, 134 does not rotate relative to the threaded shaft, the torque from the nut 70, 102, 122 is translated to longitudinal force. The longitudinal force is then applied by the pressure surface 22 to the apparatus.

When the nut fastener 10, 100, 120 has been tightened to the desired torque level, the torque tool is removed from the wrench bearing surfaces 74, 124. If the end of the torque tool is used to push the engagement surface 56 of the collar 50, removal of the torque tool also releases the collar 50. This allows the springs 90, 92 to bias the collar 50 toward the nut 70, 102, 122 until the first stop surface 52 of the collar 50 contacts the second stop surface 76 of the nut 70, 102, 122. As a result, the second collar recesses 64 receive the tabs 82, 128 of the nut 70, 102, 122. This creates a positive lock that prevents the nut 70, 102, 122 from loosening because the engagement between the nut tabs 82, 128 in the second collar recesses 64 prevent relative rotation between the nut 70, 102, 122 and the collar 50; and the engagement between the first collar recesses 58 and the retaining ring tabs 36 prevents relative rotation between the collar 50 in the retaining ring 20, 108, 134; and the engagement between the retaining ring inner tab 24 and the shaft slot prevents relative rotation between the retaining ring 20, 108, 134 and the threaded shaft. In a preferred embodiment of the nut fastener 10, 100, 120, the collar 50 may be provided with 36 locking recesses 64 and each locking recess 64 may represent 0.002" of threaded travel between the nut 70, 102, 122 and the threaded shaft. This arrangement may be particularly useful for wheel hub applications that require a specified end play for the bearings, such as 0.001"-0.005", since the required end play can be essentially dialed-in by adjusting the nut 70, 102, 122 by a certain number of locking positions 64.

Some of the advantages of the nut fastener 10, 100, 120 are also now apparent. The nut fastener 10, 100, 120 provides a positive lock between a threaded shaft and the nut 70, 102, 122. Therefore, even when the nut fastener 10, 100, 120 is subject to vibrations during use, it will not inadvertently loosen since the nut fastener 10, 100, 120 does not rely on merely increasing the resistance force to loosening, but instead solidly locks the nut 70, 102, 122 to prevent loosening. The nut fastener 10, 100, 120 is also designed to be robust so that the locking features cannot be easily broken or overcome. Thus, the nut fastener 10, 100, 120 may be particularly useful in applications, such as axle nuts where extreme torque is applied to the nut. The nut fastener 10, 100, 120 also achieves these advantages without causing an increase in torque needed to tighten the nut 70, 102, 122, which makes it easier to apply precise longitudinal force to the apparatus, such as when the nut 70, 102, 122 is used to preload wheel bearings. The nut fastener 10, 100, 120 is also useful in setting precise end play for wheel bearings and other applications. The friction surface between the first and second bearing surfaces 30, 80, 104, 116 of the retaining ring 20, 108, 134 and the nut 70, 102, 122 may also be optimized to reduce the friction that occurs during tightening of the nut 70, 102, 122.

Figure 13:
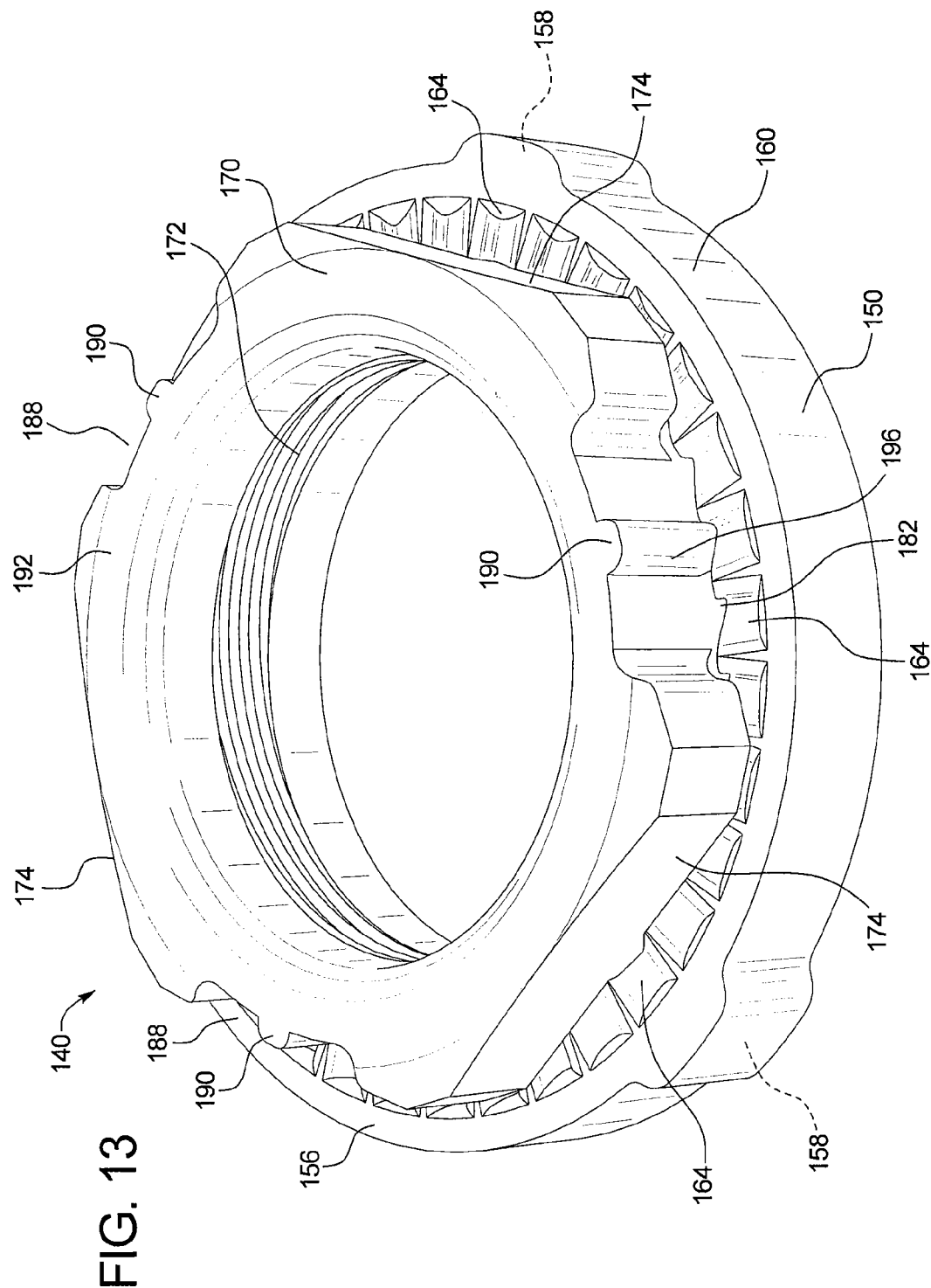
FIG. 13 is a top perspective view of another embodiment of a nut fastener.
Figure 14:
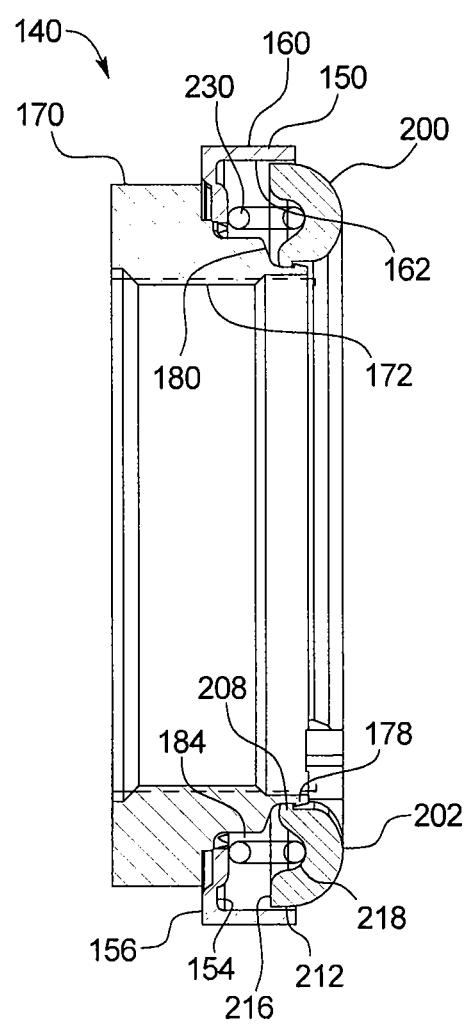
FIG. 14 is a side cross-sectional view of the nut fastener of FIG. 13.

Turning to FIGS. 13-17, another embodiment of the nut fastener 140 is shown. Those of ordinary skill in the art will recognize that a number of features of the nut fastener 140 are equivalent to features already described above. Therefore, the entire description provided above need not be repeated for an understanding of the nut fastener 140 shown in FIGS. 13-17. As shown in FIGS. 13 and 14, the nut fastener 140 includes a collar 150, nut 170, retaining ring 200, and spring 230. The nut 170 may be made by hot forging, and the collar 150 and retaining ring 200 may be made by stamping. However, other manufacturing processes may also be used.

Figure 15:
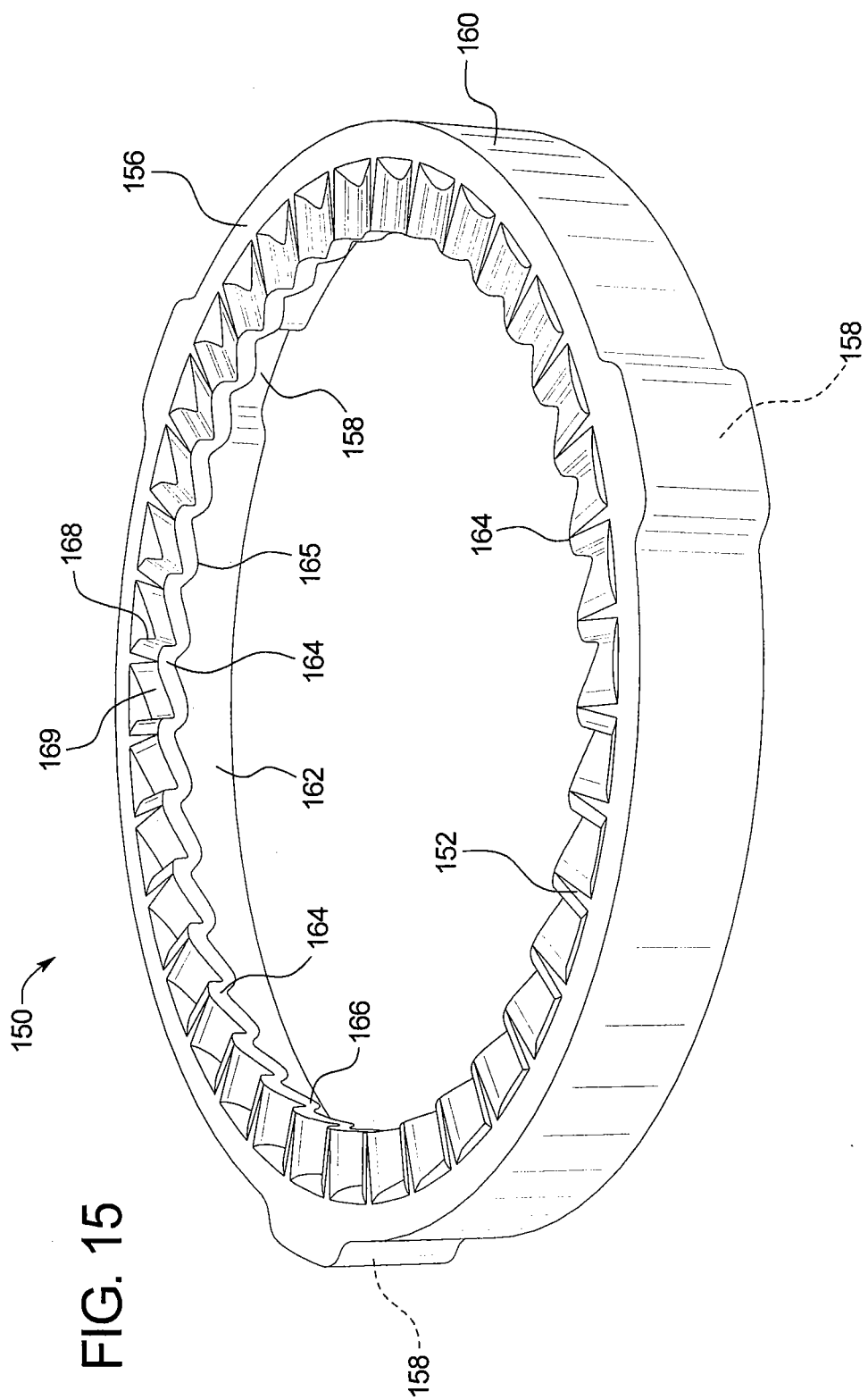
FIG. 15 is a perspective view of another embodiment of a collar.

As shown in FIG. 15, the collar 150 includes a first stop surface 152, third stop surface 154, engagement surface 156, first recesses 158, or third rotational retaining members 158, bent portion 160, second slide surface 162, first ratchet teeth 164, or fourth rotational retaining members 164, third slide surface 166, locking surfaces 168, and inclined surfaces 169.

Figure 16:
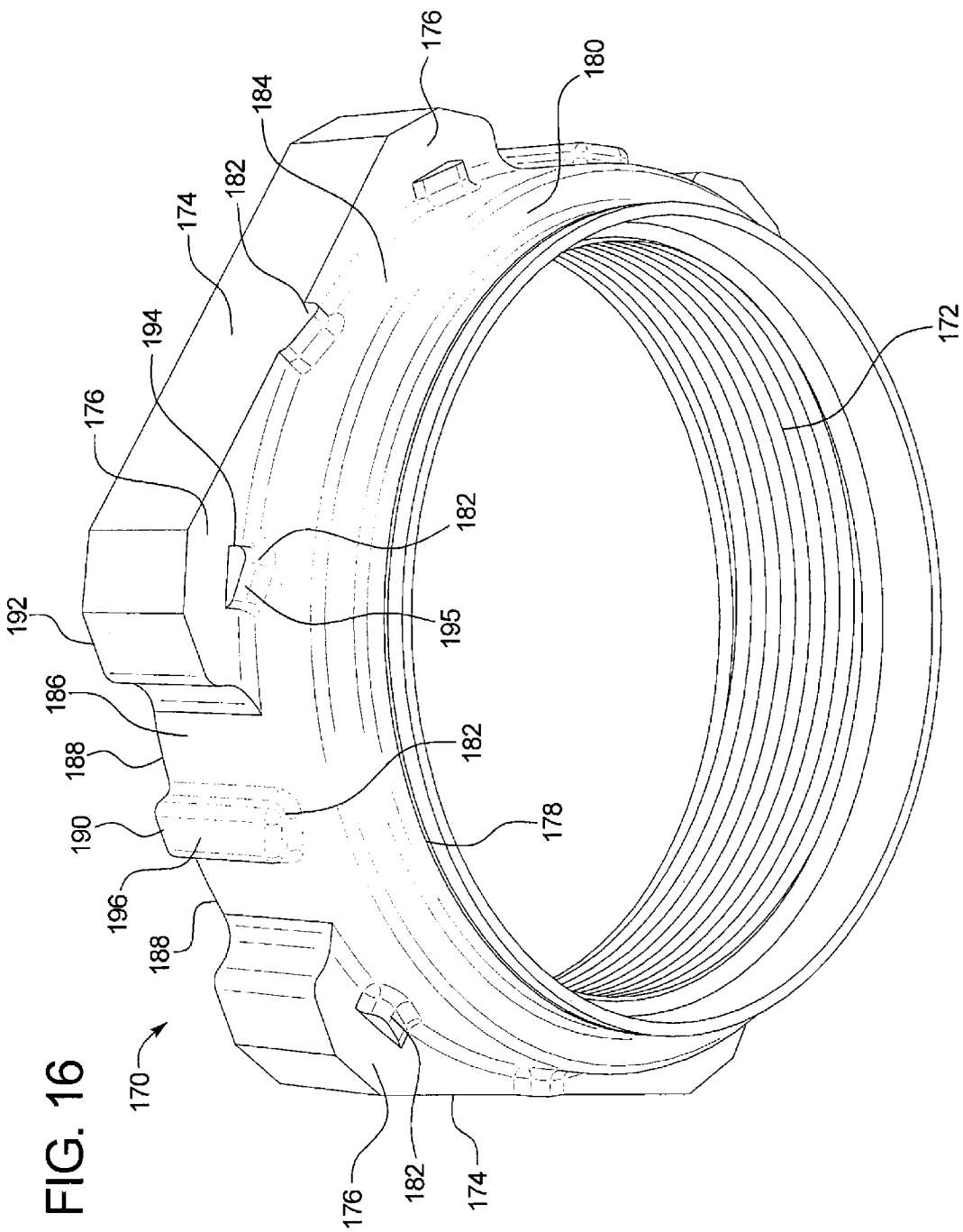
FIG. 16 is a perspective view of another embodiment of a nut.

As shown in FIG. 16, the nut 170 includes inner threads 172, wrench bearing surfaces 174, second stop surface 176, bead 178, or second longitudinal retaining member 178, second torque bearing surface 180, second ratchet teeth 182, or fifth rotational retaining members 182, fourth slide surface 184, recessed wrench bearing surfaces 186, recessed areas 188, tab end 190, top surface 192, locking surfaces 194, inclined surfaces 195, and tab 196.

Figure 17:
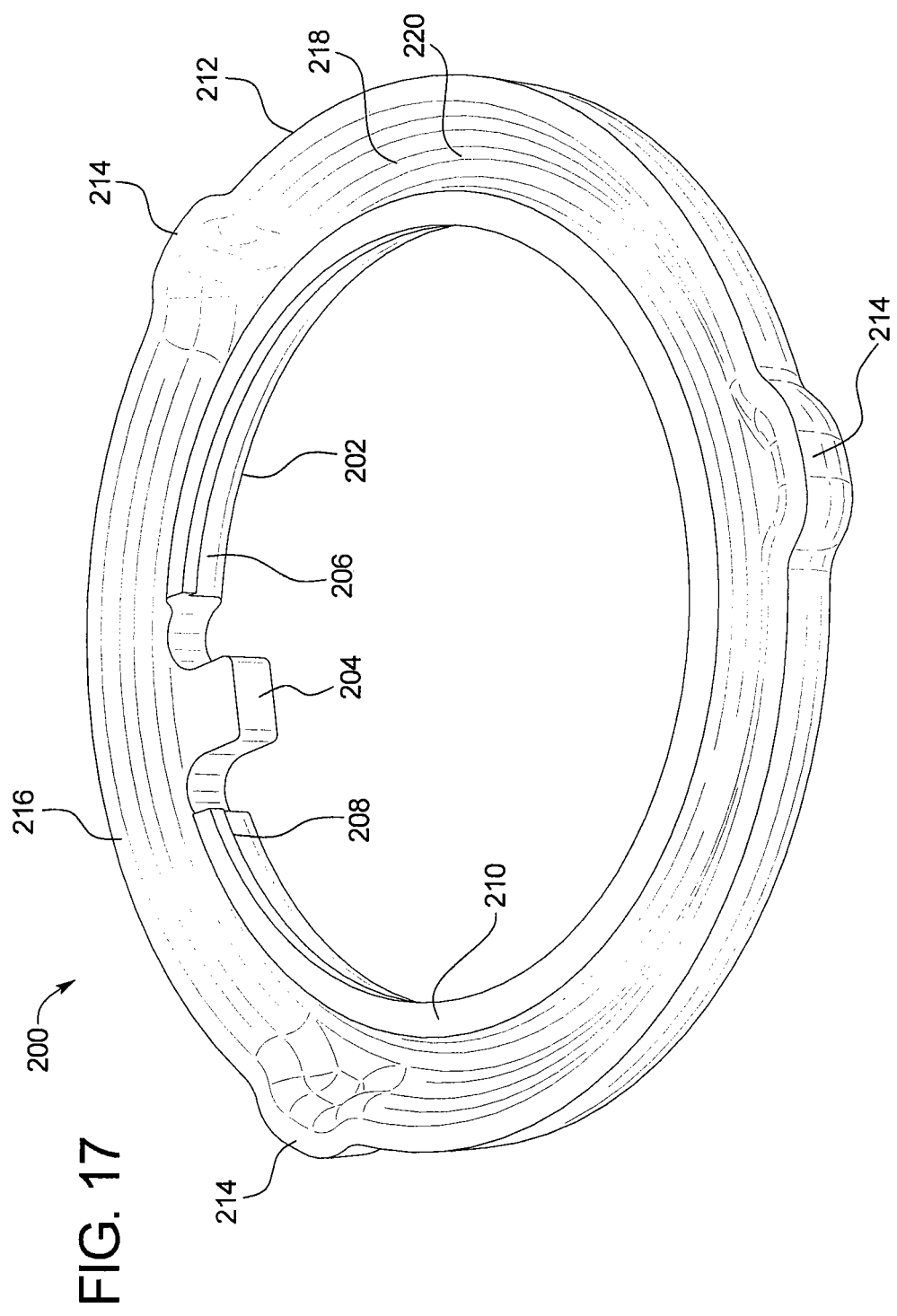
FIG. 17 is a perspective view of another embodiment of a retaining ring.

As shown in FIG. 17, the retaining ring 200 includes a pressure face 202, inner tab 204, inner diameter 206, undercut 208, or first longitudinal retaining surface 208, first torque bearing surface 210, outer diameter 212, or first slide surface 212, tabs 214, or second rotational retaining members 214, fourth stop surface 216, groove 218, and bottom 220 of groove 218, or first spring abutment surface 220.

While the nut fastener 140 is similar to the nut fasteners 10, 100, 120 described above, the nut fastener 140 includes some distinct features that may provide additional advantages. For example, the nut 170 and the collar 150 lock together through ratchet teeth 182, 164 on the nut 170 and the collar 150. Each of the nut ratchet teeth 182 face downward and have a locking surface 194 and an inclined surface 195. Each of the collar ratchet teeth 164 face upward and have a corresponding locking surface 168 and inclined surface 169. As a result, when the nut 170 is tightened, the collar 150 does not need to be independently pushed to unlock the nut fastener 140. Instead, the inclined surfaces 195, 169 of the nut ratchet teeth 182 and collar ratchet teeth 164 slide against each other when the nut 170 is rotated in the tightening direction and force the collar 150 against the spring 230. This may be more intuitive to the operator and may prevent damage to the nut fastener 140 if an operator inadvertently attempts to tighten the nut 170 without actively pushing against the collar 150. However, after the nut 170 is tightened, the locking surfaces 194, 168 of the nut ratchet teeth 182 and collar ratchet teeth 164 will engage each other and prevent the nut 170 from rotating in the loosening direction. Thus, in order to loosen the nut 170, the collar 150 must be independently pushed against the spring 230 in order to release the ratchet teeth 182, 164.

As shown in FIG. 16, at least one of the ratchet teeth 182 on the nut 170 may be on end of the tab 196 that extends through the recessed area 188 so that the end 190 of the tab 196 may be flush with the top surface 192 of the nut 170. This may provide the operator with a visual indication of the locking arrangement between the nut 170 and the collar 150.

As shown in FIGS. 13, 14 and 17, the retaining ring 200 may be made so that the outer diameter 212 fits within the bent portion 160 of the collar 150. Thus, the outer diameter 212 of the retaining ring 200 acts as the first slide surface 212 and slides along the second slide surface 162 of the collar 150. The tabs 214 of the retaining ring 200 may extend outward from the outer diameter 212 and may fit within the first recesses 158 of the collar 150. Thus, no portion of the retaining ring 200 extends outward from the collar 150 and is generally not visible during tightening and loosening of the nut fastener 140. Like the retaining ring 20 shown in FIG. 8, the retaining ring 200 may have a groove 218 for the spring 230 which extends circumferentially around the nut fastener 140. However, in order to reduce the diameter of the nut fastener 140, a coiled spring 230 may be used between the retaining ring 200 and collar 150.

As shown in FIGS. 14 and 15, the underside 165 of the ratchet teeth 164 of the collar 150 may act as the opposing surface for the spring 230. The third stop surface 154 of the collar 150 may be separate from the underside 165 of the ratchet teeth 164 and may be located radially outward therefrom. The engagement surface 156 of the collar 150 may also be a flat ring located radially outward from the ratchet teeth 164.

It is now apparent that the nut fastener 140 functions in a similar manner to the nut fasteners 10, 100, 120 described above and has similar advantages. However, the differences described above and shown in the figures may provide desirable improvements over the previously described nut fasteners 10, 100, 120.

While preferred embodiments of the invention have been described, it should be understood that the invention is not so limited, and modifications may be made without departing from the invention. The scope of the invention is defined by the appended claims, and all devices that come within the meaning of the claims, either literally or by equivalence, are intended to be embraced therein. Furthermore, the advantages described above are not necessarily the only advantages of the invention, and it is not necessarily expected that all of the described advantages will be achieved with every embodiment of the invention.

We claim:

1. A nut fastener, comprising:
    a retaining ring comprising a first rotational retaining member engageable with a shaft thereby preventing relative rotation between said retaining ring and said shaft, a pressure surface adapted to apply longitudinal force to an apparatus a first longitudinal retaining member, a first torque bearing surface, a first spring abutment surface, and a second rotational retaining member;
    a collar comprising a third rotational retaining member engaged with said second rotational retaining member thereby preventing relative rotation between said collar and said retaining ring, said collar comprising a bent portion extending longitudinally toward said retaining ring, an inner surface of said bent portion encompassing an outer circumference of said retaining ring, wherein said third rotational retaining member is disposed along said bent portion and said second rotational retaining member of said retaining ring is disposed along an outer surface thereof, and said collar comprising a second spring abutment surface, a fourth rotational retaining member, and an engagement surface;
    a spring disposed between said first spring abutment surface and said second spring abutment surface, said spring thereby biasing said collar away from said retaining ring and said collar being longitudinally moveable toward said retaining ring by compressing said spring, and;

a nut comprising a second longitudinal retaining member engaged with said first longitudinal retaining member thereby preventing said nut and said retaining ring from separating from each other, a second torque bearing surface engaged with said first torque bearing surface thereby translating torque from said nut to said retaining ring, a fifth rotational retaining member engageable with said fourth rotational retaining member thereby preventing relative rotation between said nut and said collar when said collar is biased away from said retaining ring by said spring, inner threads engageable with external threads on said shaft, and a plurality of wrench bearing surfaces engageable with a tool to rotate said nut;

wherein a force applied to said engagement surface compresses said spring and moves said collar toward said retaining ring, said fourth rotational retaining member and said fifth rotational retaining member thereby disengaging from each other to allow relative rotation between said nut and said collar.

2. The nut fastener according to claim 1, wherein said second rotational retaining member is a tab disposed along said outer circumference of said retaining ring extending away from an axis of said fastener and said third rotational retaining member is a recess disposed along said inner surface of said bent portion receiving said tab.

3. The nut fastener according to claim 2, further comprising at least three of said second rotational retaining member and at least three of said third rotational retaining member equally spaced around a circumference of said retaining ring.

4. The nut fastener according to claim 1, wherein said fifth rotational retaining member is a tab extending away from an axis of said fastener and said fourth rotational retaining member is a recess receiving said tab, said collar comprising a plurality of said recesses disposed around an inner circumference of said collar.

5. The nut fastener according to claim 4, further comprising at least three of said fifth rotational retaining member and at least three of said fourth rotational retaining member equally spaced around a circumference of said nut.

6. The nut fastener according to claim 1, wherein said first rotational retaining member is a tab engageable with a slot in said shaft.

7. The nut fastener according to claim 1, wherein said spring is a circular spring disposed around an axis of said fastener, said first spring abutment surface being a ring extending around said axis.

8. The nut fastener according to claim 1, wherein said spring is a coil spring and said first spring abutment surface is a bottom of a spring pocket.

9. The nut fastener according to claim 1, wherein said first torque bearing surface and said second torque bearing surface are angled surfaces with said first torque bearing surface facing away from said pressure surface.

10. The nut fastener according to claim 1, wherein said second longitudinal retaining member is a flared portion of said nut and said first longitudinal retaining member is an angled surface corresponding to said flared portion.

11. The nut fastener according to claim 1, wherein said collar is a stamping from a plate, said collar thereby having a generally uniform thickness.

12. The nut fastener according to claim 1, wherein said nut further comprises a recess along at least one of said wrench bearing surfaces, wherein an end of said fifth rotational retaining member is visible through said recess.

13. The nut fastener according to claim 12, wherein said collar comprises a first stop surface and said nut comprises a second stop surface engageable with said first stop surface thereby restraining longitudinal movement of said collar by said spring when said fourth rotational retaining member and said fifth rotational retaining member are engaged, and said end of said fifth rotational retaining member extends past said second stop surface toward said wrench bearing surfaces.

14. The nut fastener according to claim 13, further comprising three of said wrench bearing surfaces with said recess, each of said three wrench bearing surfaces disposed between two of said wrench bearing surfaces without said recess.

15. The nut fastener according to claim 1, wherein said collar is a stamping from a plate, said collar thereby having a generally uniform thickness, said inner surface of said bent portion encompassing said entire outer circumference of said retaining ring, wherein no portion of said retaining ring extends out from said inner surface of said bent portion.

16. The nut fastener according to claim 1, wherein said second rotational retaining member is a retaining ring tab disposed along said outer circumference of said retaining ring extending away from an axis of said fastener, said third rotational retaining member is a first collar recess disposed along said inner surface of said bent portion receiving said retaining ring tab, said fifth rotational retaining member is a nut tab extending away from an axis of said fastener, and said fourth rotational retaining member is a second collar recess receiving said nut tab, said collar comprising a plurality of said second collar recesses disposed around an inner circumference of said collar.

17. The nut fastener according to claim 16, wherein said first torque bearing surface and said second torque bearing surface are angled surfaces with said first torque bearing surface facing from said pressure surface.

18. The nut fastener according to claim 17, further comprising at least three of said second rotational retaining member and at least three of said third rotational retaining member equally spaced around a circumference of said retaining ring, and at least three of said fifth rotational retaining member and at least three of said fourth rotational retaining member equally spaced around a circumference of said nut.

19. The nut fastener according to claim 18, wherein said collar comprises a first stop surface and said nut comprises a second stop surface engageable with said first stop surface thereby restraining longitudinal movement of said collar by said spring when said fourth rotational retaining member and said fifth rotational retaining member are engaged, said first rotational retaining member is an inner tab engageable with a slot in said shaft, said spring being a circular spring disposed around an axis of said fastener, said first spring abutment surface being a ring extending around said axis, said collar being a stamping from a plate, said collar thereby having a generally uniform thickness, and said engagement surface is generally flush with said first stop surface, said engagement surface being disposed adjacent a bottom end of said wrench bearing surfaces when said first stop surface is biased against said second stop surface by said spring, said engagement surface thereby being engageable by an end of said tool when said tool engages said wrench bearing surfaces to apply said force to disengage said fourth rotational retaining member and said fifth rotational retaining member.

20. The nut fastener according to claim 1, wherein said collar is a stamping from a plate, said collar thereby having a generally uniform thickness, said engagement surface being disposed adjacent a bottom end of said wrench bearing surfaces when said collar is biased against said nut by said spring, said engagement surface thereby being engageable by an end of said tool when said tool engages said wrench bearing surfaces to apply said force to disengage said fourth rotational retaining member and said fifth rotational retaining member, and said fifth rotational retaining member is a nut tab extending away from an axis of said fastener and said fourth rotational retaining member is a second collar recess receiving said nut tab, said collar comprising a plurality of said second collar recesses disposed around an inner circumference of said collar.

21. The nut fastener according to claim 20, wherein said second rotational retaining member is a retaining ring tab disposed along said outer circumference of said retaining ring extending away from an axis of said fastener and said third rotational retaining member is a first collar recess disposed along said inner surface of said bent portion receiving said retaining ring tab, further comprising at least three of said second rotational retaining member and at least three of said third rotational retaining member equally spaced around a circumference of said retaining ring, and at least three of said fifth rotational retaining member and at least three of said fourth rotational retaining member equally spaced around a circumference of said nut.

22. The nut fastener according to claim 1, wherein said second rotational retaining member is a retaining ring tab disposed along said outer circumference of said retaining ring extending away from an axis of said fastener and said third rotational retaining member is a first collar recess disposed along said inner surface of said bent portion receiving said retaining ring tab, said fifth rotational retaining member is a nut tab extending away from an axis of said fastener and said fourth rotational retaining member is a second collar recess receiving said tab, said collar comprising a plurality of said second collar recesses disposed around an inner circumference of said collar, further comprising at least three of said second rotational retaining member and at least three of said third rotational retaining member equally spaced around a circumference of said retaining ring, and at least three of said fifth rotational retaining member and at least three of said fourth rotational retaining member equally spaced around a circumference of said nut, said first rotational retaining member being an inner tab engageable with a slot in said shaft, said first torque bearing surface and said second torque bearing surface being angled surfaces with said first torque bearing surface facing from said pressure surface, said collar being a stamping from a plate, said collar thereby having a generally uniform thickness, and said engagement surface being disposed adjacent a bottom end of said wrench bearing surfaces when said collar is biased against said nut by said spring, said engagement surface thereby being engageable by an end of said tool when said tool engages said wrench bearing surfaces to apply said force to disengage said fourth rotational retaining member and said fifth rotational retaining member.

23. The nut fastener according to claim 22, wherein said spring is a circular spring disposed around an axis of said fastener, said first spring abutment surface being a ring extending around said axis.

24. The nut fastener according to claim 1, wherein said fourth rotational retaining member is a ratchet tooth with an inclined surface and a locking surface and the fifth rotational retaining member is a corresponding ratchet tooth with a corresponding inclined surface and a corresponding locking surface, said inclined surfaces biasing said collar toward said retaining ring to allow relative rotation between said nut and said collar in a tightening direction, and when said force is not applied said locking surfaces prevent relative rotation between said nut and said collar in a loosening direction.

25. The nut fastener according to claim 1, wherein said inner surface of said bent portion encompassing said entire outer circumference of said retaining ring, wherein no portion of said retaining ring extends out from said inner surface of said bent portion.

26. The nut fastener according to claim 1, wherein said second rotational retaining member is a retaining ring tab disposed along said outer circumference of said retaining ring extending away from an axis of said fastener, said third rotational retaining member is a first collar recess disposed along said inner surface of said bent portion receiving said retaining ring tab, further comprising at least three of said second rotational retaining member and at least three of said third rotational retaining member equally spaced around a circumference of said retaining ring, said inner surface of said bent portion encompassing said entire outer circumference of said retaining ring, wherein no portion of said retaining ring extends out from said inner surface of said bent portion, said fourth rotational retaining member is a ratchet tooth with an inclined surface and a locking surface and the fifth rotational retaining member is a corresponding ratchet tooth with a corresponding inclined surface and a corresponding locking surface, said inclined surfaces biasing said collar toward said retaining ring to allow relative rotation between said nut and said collar in a tightening direction, and when said force is not applied said locking surfaces prevent relative rotation between said nut and said collar in a loosening direction, further comprising more than three of said fifth rotational retaining member and more of said fourth rotational retaining member than said fifth rotational retaining member equally spaced around a circumference of said nut and said collar, said first rotational retaining member is an inner tab engageable with a slot in said shaft, said spring being a circular spring disposed around an axis of said fastener, said spring being disposed within a groove in said retaining ring.

27. The nut fastener according to claim 1, wherein said first longitudinal retaining member is a surface on an inner diameter of said retaining ring facing toward said pressure surface and said second longitudinal retaining member is a cylindrical portion of said nut extending through said inner diameter of said retaining ring and engaging said first longitudinal retaining member.

28. The nut fastener according to claim 1, wherein said collar comprises a first stop surface and said nut comprises a second stop surface engageable with said first stop surface thereby restraining longitudinal movement of said collar by said spring when said fourth rotational retaining member and said fifth rotational retaining member are engaged.

29. The nut fastener according to claim 28, wherein said engagement surface is generally flush with said first stop surface, said engagement surface being disposed adjacent a bottom end of said wrench bearing surfaces when said first stop surface is biased against said second stop surface by said spring, said engagement surface thereby being engageable by an end of said tool when said tool engages said wrench bearing surfaces to apply said force to disengage said fourth rotational retaining member and said fifth rotational retaining member.

30. A nut fastener, comprising:
 a retaining ring comprising a first rotational retaining member engageable with a shaft thereby preventing relative rotation between said retaining ring and said shaft, a pressure surface adapted to apply longitudinal force to an apparatus, a first longitudinal retaining member, a first torque bearing surface, a first spring abutment surface, and a second rotational retaining member;
 a collar comprising a third rotational retaining member engaged with said second rotational retaining member thereby preventing relative rotation between said collar and said retaining ring, a second spring abutment surface, a fourth rotational retaining member, and an engagement surface;

a spring disposed between said first spring abutment surface and said second spring abutment surface, said spring thereby biasing said collar away from said retaining ring and said collar being longitudinally moveable toward said retaining ring by compressing said spring, and;

a nut comprising a second longitudinal retaining member engaged with said first longitudinal retaining member thereby preventing said nut and said retaining ring from separating from each other, a second torque bearing surface engaged with said first torque bearing surface thereby translating torque from said nut to said retaining ring, a fifth rotational retaining member engageable with said fourth rotational retaining member thereby preventing relative rotation between said nut and said collar when said collar is biased away from said retaining ring by said spring, inner threads engageable with external threads on said shaft, and a plurality of wrench bearing surfaces engageable with a tool to rotate said nut;

wherein a force applied to said engagement surface compresses said spring and moves said collar toward said retaining ring, said fourth rotational retaining member and said fifth rotational retaining member thereby disengaging from each other to allow relative rotation between said nut and said collar;

wherein said fourth rotational retaining member is a ratchet tooth with an inclined surface and a locking surface and the fifth rotational retaining member is a corresponding ratchet tooth with a corresponding inclined surface and a corresponding locking surface, said inclined surfaces biasing said collar toward said retaining ring to allow relative rotation between said nut and said collar in a tightening direction, and when said force is not applied said locking surfaces prevent relative rotation between said nut and said collar in a loosening direction.

31. The nut fastener according to claim 30, wherein said collar comprises a first stop surface and said nut comprises a second stop surface engageable with said first stop surface thereby restraining longitudinal movement of said collar by said spring when said forth rotational retaining member and said fifth rotational retaining member are engaged.

32. A nut fastener, comprising:
a retaining ring comprising a first rotational retaining member engageable with a shaft thereby preventing relative rotation between said retaining ring and said shaft, a pressure surface adapted to apply longitudinal force to an apparatus, a first longitudinal retaining member, a first torque bearing surface, a first spring abutment surface, and a second rotational retaining member;

a collar comprising a third rotational retaining member engaged with said second rotational retaining member thereby preventing relative rotation between said collar and said retaining ring, a second spring abutment surface, a fourth rotational retaining member, a first stop surface, and an engagement surface;

a spring disposed between said first spring abutment surface and said second spring abutment surface, said spring thereby biasing said collar away from said retaining ring and said collar being longitudinally moveable toward said retaining ring by compressing said spring, and;

a nut comprising a second longitudinal retaining member engaged with said first longitudinal retaining member thereby preventing said nut and said retaining ring from separating from each other, a second torque bearing surface engaged with said first torque bearing surface thereby translating torque from said nut to said retaining ring, a fifth rotational retaining member engageable with said fourth rotational retaining member thereby preventing relative rotation between said nut and said collar when said collar is biased away from said retaining ring by said spring, a second stop surface engageable with said first stop surface thereby restraining longitudinal movement of said collar by said spring when said fourth rotational retaining member and said fifth rotational retaining member are engaged, inner threads engageable with external threads on said shaft, and a plurality of wrench bearing surfaces engageable with a tool to rotate said nut;

wherein a force applied to said engagement surface compresses said spring and moves said collar toward said retaining ring, said fourth rotational retaining member and said fifth rotational retaining member thereby disengaging from each other to allow relative rotation between said nut and said collar;

wherein said second rotational retaining member is a retaining ring tab extending away from an axis of said fastener, said third rotational retaining member is a first collar recess receiving said retaining ring tab, further comprising at least three of said second rotational retaining member and at least three of said third rotational retaining member equally spaced around a circumference of said retaining ring, said collar comprises a bent portion extending longitudinally toward said retaining ring, an inner surface of said bent portion encompassing an entire outer circumference of said retaining ring, wherein no portion of said retaining ring extends out from said inner surface of said bent portion, said fourth rotational retaining member is a ratchet tooth with an inclined surface and a locking surface and the fifth rotational retaining member is a corresponding ratchet tooth with a corresponding inclined surface and a corresponding locking surface, said inclined surfaces biasing said collar toward said retaining ring to allow relative rotation between said nut and said collar in a tightening direction, and when said force is not applied said locking surfaces prevent relative rotation between said nut and said collar in a loosening direction, further comprising more than three of said fifth rotational retaining member and more of said fourth rotational retaining member than said fifth rotational retaining member equally spaced around a circumference of said nut and said collar, said first rotational retaining member is an inner tab engageable with a slot in said shaft, said spring being a circular spring disposed around an axis of said fastener, said spring being disposed within a groove in said retaining ring, said engagement surface is generally flush with said first stop surface, said engagement surface being disposed adjacent a bottom end of said wrench bearing surfaces when said first stop surface is biased against said second stop surface by said spring, said engagement surface thereby being engageable by an end of said tool when said tool engages said wrench bearing surfaces to apply said force to disengage said fourth rotational retaining member and said fifth rotational retaining member.

* * * * *